United States Patent
Du et al.

(10) Patent No.: US 9,878,687 B2
(45) Date of Patent: Jan. 30, 2018

(54) VEHICLE ENERGY ABSORBING DEVICE

(71) Applicants: Compagnie Plastic Omnium, Lyons (FR); Yanfeng Plastic Omnium Automotive Exterior Systems Co., Ltd., Jiading District, Shanghai (CN)

(72) Inventors: Chunhuan Du, Shanghai (CN); Jing Mao, Shanghai (CN)

(73) Assignees: Compagnie Plastic Omnium, Lyons (FR); Yangfeng Plastic Omnium Automotive Exterior Systems Co., Ltd., Shanghai (CN)

( * ) Notice: Subject to any disclaimer, the term of this patent is extended or adjusted under 35 U.S.C. 154(b) by 0 days.

(21) Appl. No.: 14/898,845

(22) PCT Filed: Jun. 18, 2014

(86) PCT No.: PCT/CN2014/080240
§ 371 (c)(1),
(2) Date: Dec. 16, 2015

(87) PCT Pub. No.: WO2014/202007
PCT Pub. Date: Dec. 24, 2014

(65) Prior Publication Data
US 2016/0137158 A1 May 19, 2016

(30) Foreign Application Priority Data

Jun. 18, 2013 (CN) .......................... 2013 1 0241902

(51) Int. Cl.
*B60R 21/34* (2011.01)
*B60R 19/04* (2006.01)
*B60R 19/18* (2006.01)

(52) U.S. Cl.
CPC .............. *B60R 21/34* (2013.01); *B60R 19/04* (2013.01); *B60R 19/18* (2013.01); *B60R 2019/186* (2013.01)

(58) Field of Classification Search
CPC ......... B60R 19/03; B60R 19/18; B60R 21/34; B60R 19/04
(Continued)

(56) References Cited

U.S. PATENT DOCUMENTS 7,086,690 B2 * 8/2006 Shuler .................... B60R 19/12
293/132
7,344,008 B1 3/2008 Jonsson et al.
(Continued)

FOREIGN PATENT DOCUMENTS

CN 1558846 A 12/2004
CN 1849234 A 10/2006
(Continued)

OTHER PUBLICATIONS

Machine Translation of WO2006/117477, printed from the EPO website, Jun. 29, 2017.*
(Continued)

*Primary Examiner* — Jason S Morrow
(74) *Attorney, Agent, or Firm* — Harness, Dickey & Pierce, P.L.C.

(57) ABSTRACT

Example embodiments relate to a vehicle energy absorbing device that includes a primary energy absorbing box and a secondary energy absorbing box, the primary energy absorbing box having a U-shaped cross section with a bottom and a wall extending therefrom, the secondary energy absorbing box being nested inside the primary energy absorbing box. In the event of a collision between a car and a pedestrian, the secondary energy absorbing box of the vehicle energy absorbing device is configured to provide continuous stiff-
(Continued)

ness when the primary energy absorbing box is almost collapsed, so as to protect lower legs of pedestrians and reduce harm thereto. The vehicle energy absorbing device can not only decrease harm to lower legs of pedestrians, but also reduce damage to automobiles as a result of a low-speed collision.

19 Claims, 3 Drawing Sheets

(58) Field of Classification Search
USPC .............. 293/120, 211, 133, 121; 296/187.04
See application file for complete search history.

(56) References Cited

U.S. PATENT DOCUMENTS

| | | | |
|---|---|---|---|
| 8,215,686 B2* | 7/2012 | Czopek | B29C 51/10 293/133 |
| 2003/0020291 A1* | 1/2003 | Roussel | B60R 19/18 293/120 |
| 2003/0047952 A1 | 3/2003 | Trappe | |
| 2003/0080573 A1* | 5/2003 | Marijnissen | B60R 19/18 293/132 |
| 2005/0057053 A1 | 3/2005 | Evans et al. | |
| 2006/0028038 A1 | 2/2006 | Glasgow et al. | |
| 2006/0145491 A1* | 7/2006 | Shuler | B60R 19/18 293/120 |
| 2006/0284431 A1 | 12/2006 | Evans et al. | |
| 2007/0108778 A1 | 5/2007 | Evans et al. | |
| 2007/0200376 A1* | 8/2007 | Jaarda | B60R 19/18 293/120 |
| 2008/0185851 A1* | 8/2008 | Evans | B60R 19/18 293/120 |
| 2009/0160203 A1 | 6/2009 | Garg et al. | |
| 2010/0066106 A1* | 3/2010 | Nojima | B60R 19/18 293/120 |
| 2011/0006554 A1 | 1/2011 | Mani | |
| 2011/0210570 A1* | 9/2011 | Cormier | B60R 19/22 293/120 |
| 2015/0274109 A1* | 10/2015 | Narita | B60R 19/18 293/102 |
| 2016/0193977 A1* | 7/2016 | Calleja | B60R 19/12 293/115 |
| 2016/0200271 A1* | 7/2016 | Steinhilb | B60R 19/18 293/132 |
| 2016/0200272 A1* | 7/2016 | Frederick | B60R 19/18 293/120 |

FOREIGN PATENT DOCUMENTS

| | | |
|---|---|---|
| CN | 101844550 A | 9/2010 |
| CN | 201890203 U | 7/2011 |
| CN | 202389322 U | 8/2012 |
| CN | 202541478 U | 11/2012 |
| CN | 102837655 A | 12/2012 |
| CN | 102910128 A | 2/2013 |
| CN | 103287381 A | 9/2013 |
| CN | 203294056 U | 11/2013 |
| EP | 1878620 A1 | 1/2008 |
| WO | WO-2005012043 A1 | 2/2005 |
| WO | WO-2006/117477 A1 * | 11/2006 |

OTHER PUBLICATIONS

International Search Report and Written Opinion dated Sep. 19, 2014 for corresponding PCT Patent Application No. PCT/CN2014/080240, and English translation thereof.

International Preliminary Report on Patentability dated Dec. 16, 2015 for corresponding PCT Patent Application No. PCT/CN2014/080240.

International Search Report PCT/ISA/210 for International Application No. PCT/CN2014/080240 dated Sep. 19, 2014.

Chinese Office Action corresponding to Chinese Application No. 201310241902.X dated Feb. 28, 2015, and English translation thereof.

Supplementary European Search Report dated Jan. 16, 2017 for corresponding application PCT/CN2014080240.

* cited by examiner

VEHICLE ENERGY ABSORBING DEVICE

CROSS-REFERENCE TO RELATED APPLICATIONS

This application is the U.S. National Phase application of PCT Application No. PCT/CN2014/080240 filed on Jun. 18, 2014, which claims priority to Chinese Application No. 201310241902.X filed on Jun. 18, 2013, the contents of each of which are incorporated herein by reference.

TECHNICAL FIELD

The present invention relates to a vehicle component, and more particularly to a vehicle energy absorbing device.

BACKGROUND

As the automobile industry continuously develops and the consumption market becomes increasingly mature, people attach more and more importance to vehicle crash safety. On the one hand, unreasonable deformation occurring in crash will lead to a reduction of a living space in the occupant compartment, thereby severely threatening the safety of occupants, and current vehicle anti-crash energy absorbing devices are mainly designed for that purpose. On the other hand, people's attention is not only confined to the safety of occupants in a vehicle, but also extended to that of pedestrians in a car crash. If a car collides with a pedestrian, the car body is often in direct contact with the legs of the pedestrian, thereby causing damages to the legs. Current vehicle anti-crash energy absorbing devices designed for the sake of occupant safety can hardly satisfy the requirement of the national standard GB/T24550-2009. The patent application No. 201120557659.9 provides a bumper beam of a vehicle bumper designed for protecting lower legs of pedestrians, which comprises a first-stage energy absorbing area and a second-stage energy absorbing area that are adjacent to each other; however, the energy absorbing devices cannot meet the requirement of GB 17354 for low-speed car crashes. Current energy absorbing devices designed for the sake of pedestrian safety all fail to satisfy the above two requirements simultaneously, so it is urgent to have a vehicle energy absorbing device that can not only decrease harms to lower legs of pedestrians, but also reduce damages to automobiles as a result of low-speed crash.

SUMMARY OF THE INVENTION

To solve the problems in the prior art, the present invention is intended to provide a vehicle energy absorbing device that can not only decrease harms to lower legs of pedestrians, but also reduce damages to automobiles as a result of low-speed crash, so as to meet the requirements of relevant rules and regulations.

The vehicle energy absorbing device according to the present invention comprises a primary energy absorbing box and a secondary energy absorbing box, said primary energy absorbing box having a U-shaped cross section with a bottom and walls extending therefrom, said secondary energy absorbing box being nested inside said primary energy absorbing box.

By means of the above technical solution, the present invention is able to achieve that in the crash of a car with a pedestrian, said secondary energy absorbing box can provide continuous stiffness when said primary energy absorbing box is nearly collapsed, so as to protect lower legs of pedestrians and reduce harms to legs of pedestrians. The vehicle energy absorbing device of the present invention can meet the requirements of both GB/T24550-2009 and GB 17354. It can not only decrease harms to lower legs of pedestrians, but also reduce damages to automobiles as a result of low-speed crash.

In an embodiment, said energy absorbing device further comprises a bumper system with a front bumper beam, and an overlap between said primary energy absorbing box and said front bumper beam is more than 80%.

In an embodiment, the nesting amount of said secondary energy absorbing box is less than 10% of the depth of said primary energy absorbing box.

In an embodiment, said energy absorbing device further comprises a skin, said secondary energy absorbing box being integrated onto said skin.

In an embodiment, said energy absorbing device further comprises a lower grid and an upper grid, said primary energy absorbing box being fixed to said lower grid and said upper grid.

In an embodiment, said primary energy absorbing box has an U upper end snap structure which cooperates with an energy absorbing box mounting structure of said upper grid and an U lower end snap structure which cooperates with an energy absorbing box mounting structure of said lower grid.

In an embodiment, said primary energy absorbing box is injection molded from polypropylene, EPDM rubber, and 10% talc modified material.

In an embodiment, reinforcing rib structures are uniformly distributed within said primary energy absorbing box at a location corresponding to said bottom.

Preferably, said reinforcing rib structures have a height of 10 mm and a wall thickness of 2.5 mm.

In an embodiment, said walls of said primary energy absorbing box has a castellated outer surface, comprising energy absorbing box bosses and energy absorbing box recesses that are staggered in sequence.

Preferably, said energy absorbing box bosses have a width of 40 mm, said energy absorbing box recesses have a width of 70 mm, and the height difference therebetween is 5 mm.

Preferably, said walls have a bending point at a central portion thereof.

Preferably, said walls has a bending angle of 4 degrees at said bending point.

In an embodiment, said primary energy absorbing box has a U opening at which said primary energy absorbing box is provided with at least one hinge.

In an embodiment, on the bottom of said secondary energy absorbing box are there boss structures with different heights.

In an embodiment, a backside opening structure is provided at the center of said boss structures.

Preferably, said backside opening structure is a 40 mm*15 mm square orifice.

In an embodiment, said energy absorbing device comprises a bumper system having a front bumper beam, said front bumper beam comprising a transverse beam that conforms to said bottom of said primary energy absorbing box.

Preferably, the gap between said transverse beam and said bottom is 8 mm.

The present invention further relates to a vehicle comprising said vehicle energy absorbing device as stated above.

Figure 1:
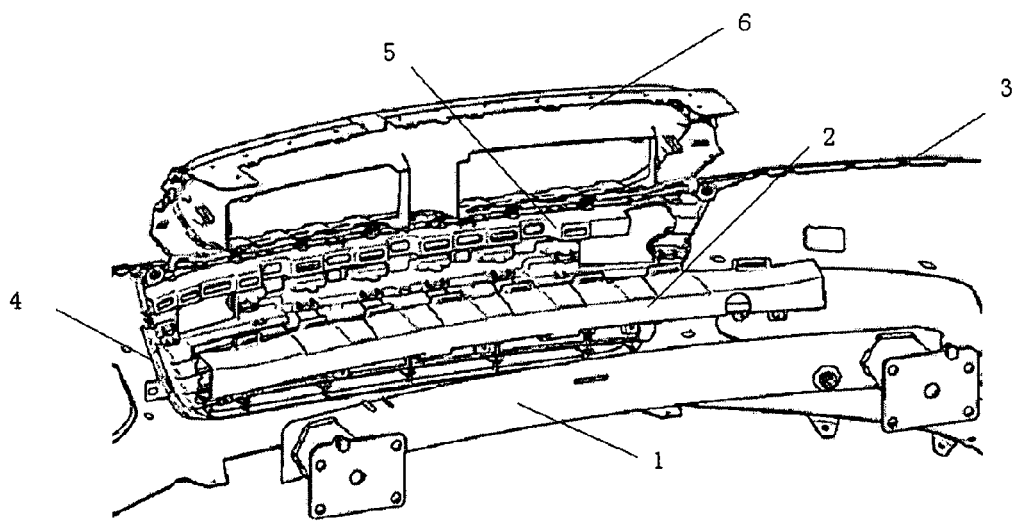
FIG. 1 is an exploded view of the holistic structure of a vehicle energy absorbing device according to the present invention.

Wherein,
1 front bumper beam
   11 transverse beam
   12 securing structures at both ends
2 primary energy absorbing box
   21 hinge
   22a bosses
   22b recesses
   23 mounting structure
   24 bottom of the U
   25 wall of the U
   26 U lower end snap structure
   27 U upper end snap structure
   28 bending point
   29 opening of the U
3 skin
4 lower grid
   41 energy absorbing box mounting structure of the lower grid
5 secondary energy absorbing box
   51 backside opening structure
   52 boss structure
6 upper grid
   61 energy absorbing box mounting structure of the upper grid
7 peripheral vehicle parts

DETAILED DESCRIPTION OF EMBODIMENTS

Better embodiments of the present invention will be provided and described in detail with reference to the drawings.

Figure 2:
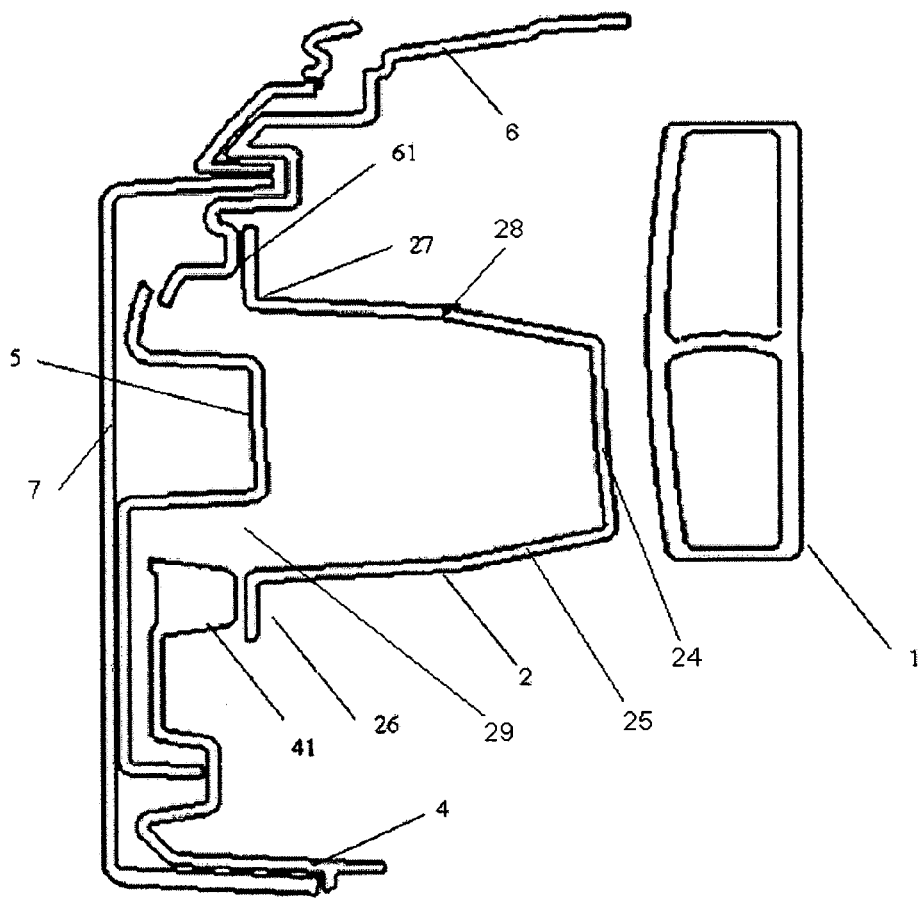
FIG. 2 is a cross-sectional view of the holistic structure of the vehicle energy absorbing device according to the present invention.

The vehicle energy absorbing device according to the present invention comprises a bumper system, a primary energy absorbing box 2 and a secondary energy absorbing box 5, wherein the bumper system has a front bumper beam 1, a skin 3, a lower grid 4 and an upper grid 6, the positional relationship of which is shown in FIGS. 1 and 2. The primary energy absorbing box 2 is fixed to the lower grid 4 and the upper grid 6 and arranged corresponding to the front bumper beam 1, and the secondary energy absorbing box 5 is integrated onto the skin 3 and nested inside the primary energy absorbing box 2. Since the front bumper beam 1, the skin 3, the lower grid 4 and the upper grid 6 are common structures of a bumper system, the mounting positions thereof will not be reiterated herein as they are not adjusted in the present invention. The specific structures added to those components or structures that are different from those in the prior art will be explained in detail.

Figure 3:
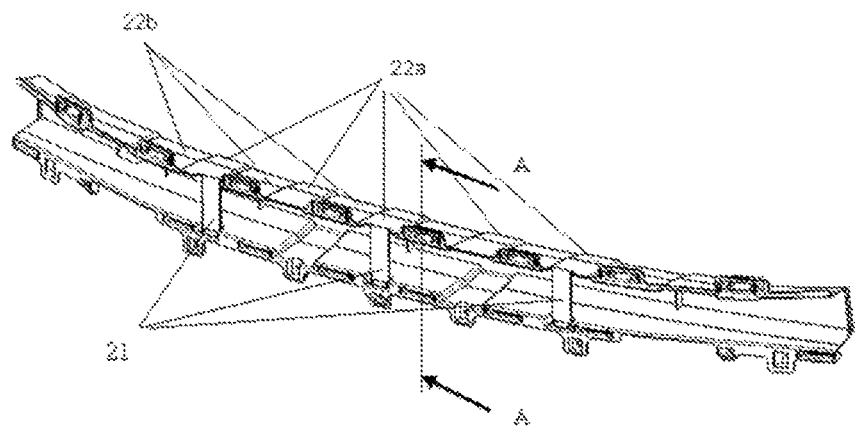
FIG. 3 is a front structural view of the primary energy absorbing box of the vehicle energy absorbing device according to the present invention.
Figure 4:
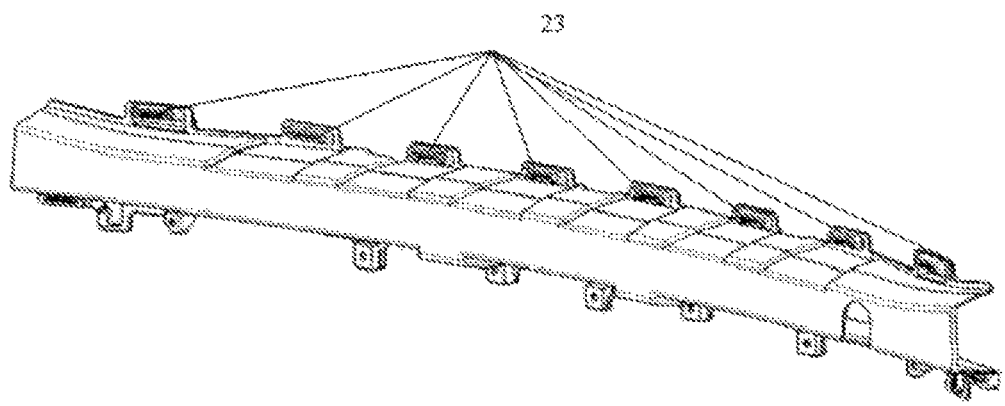
FIG. 4 is a rear structural view of the primary energy absorbing box of the vehicle energy absorbing device according to the present invention.
Figure 5:
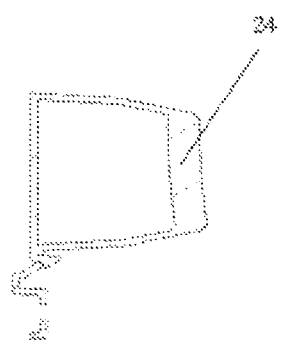
FIG. 5 is a longitudinal cross-sectional view of the primary energy absorbing box of the vehicle energy absorbing device according to the present invention taken along the line A-A of FIG. 3.

With reference to FIGS. 3 to 5, the specific structure of the primary energy absorbing box 2 of the vehicle energy absorbing device according to the present invention is shown as a thin-walled element extending transversely (in the width direction of the vehicle), the thin-walled element having a U-shaped cross-section in the longitudinal direction (in a driving direction of a vehicle), and an opening of the U 29 facing the front of the vehicle. The primary energy absorbing box 2 is shown in FIG. 2 as being installed between peripheral vehicle parts 7 and the front bumper beam 1 of the bumper system for absorption of the kinetic energy caused by crash, during the process of which the kinetic energy is transformed into deformation work to thereby prevent the front bumper beam from being permanently damaged in excess of critical load. To explain the dimension of the vehicle energy absorbing device of the present invention in a clearer manner, the dimension in the transverse direction is called a width, that in the longitudinal direction a depth and that in the vertical direction a height. In a preferred embodiment, the primary energy absorbing box 2 has a width of about 1000 mm and a depth of about 75 mm. The primary energy absorbing box 2 has a bottom 24 and walls 25 longitudinally extending therefrom. With reference to FIG. 2, the walls 25 are provided at their ends respectively with an U lower end snap structure 26 and an U upper end snap structure 27 which are respectively snapped onto the lower grid 4 and the upper grid 6. In the embodiment, the upper grid 6 has an energy absorbing box mounting structure 61 that cooperates with the U upper end snap structure 27; and the lower grid 4 has an energy absorbing box mounting structure 41 that cooperates with the U lower end snap structure 26.

The primary energy absorbing box 2 is made of a plastic material, preferably being injection molded from a PP+EPDM+T10 (polypropylene, EPDM rubber, and 10% talc) modified material and having a wall thickness ranging from 2.5 mm to 3 mm. In a preferred embodiment, reinforcing rib structures are uniformly distributed within the primary energy absorbing box 2 at a location corresponding to the bottom 24, and have a height of about 10 mm and a wall thickness of about 2.5 mm. The wall 25 has a castellated outer surface of a great-wall structure, comprising energy absorbing box bosses 22a and energy absorbing box recesses 22b that are staggered in sequence.

With reference to FIG. 3, to increase the strength of the primary energy absorbing box 2 and prevent the primary energy absorbing box 2 from quick collapse in a crash, preferably, the energy absorbing box bosses 22a have a width of 40 mm, and the energy absorbing box recesses 22b have a width of 70 mm, and the height difference therebetween is 5 mm, so as to ensure that the walls 25 have a desired strength. In a preferred embodiment, the walls 25 have a bending point 28 at a central portion thereof to make the bottom gradually converge to facilitate deformation of the wall. Preferably, the bending angle is about 4 degrees. In a preferred embodiment, the opening 29 has a height of about 60 mm and the bottom 24 has a height of about 35 mm. At least one hinge 21 is arranged at the opening 29 so as to prevent the primary energy absorbing box 2 from losing too much stiffness due to the overlarge opening in the process of collapse; in addition, the hinge 21 can stabilize the shape of the primary energy absorbing box 2 before its installation, and meanwhile, the opening of the hinge structure makes it easier to install the hinge onto the bumper system. Preferably, the hinge 21 has a width of about 25 mm and there are three of them arranged. There is at least one energy absorbing box mounting structure 23 arranged at the opening 29 for snapping onto the bumper system.

Figure 6:
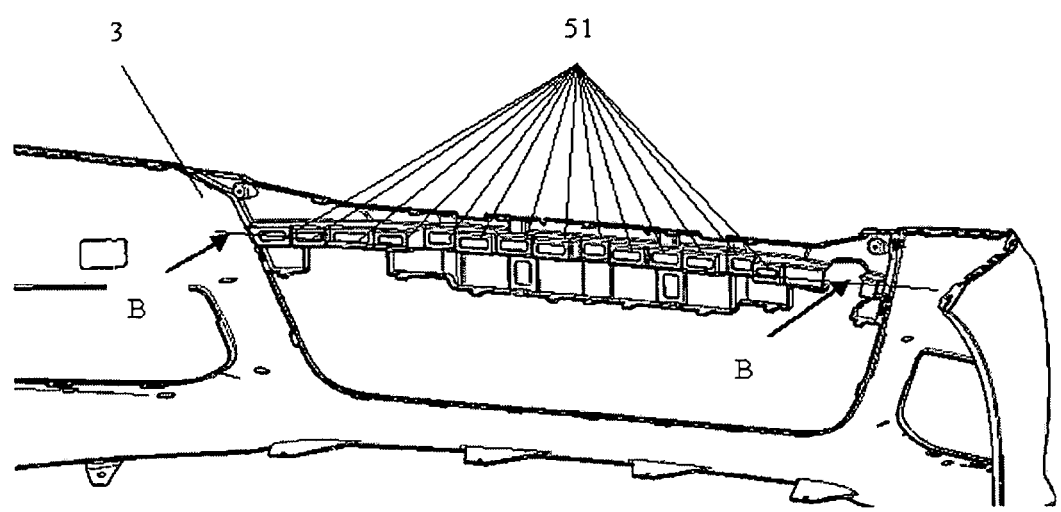
FIG. 6 is a front structural view of the secondary energy absorbing box of the vehicle energy absorbing device according to the present invention.
Figure 7:
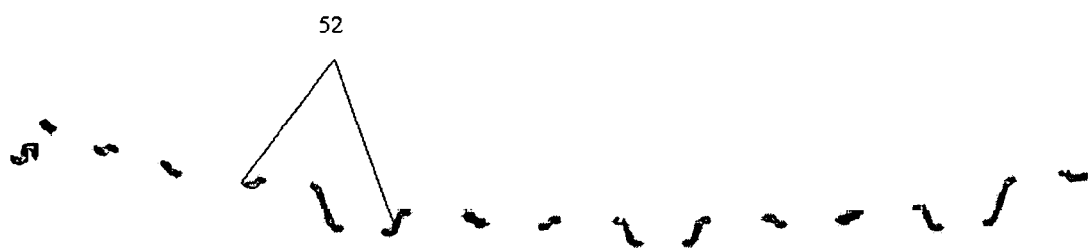
FIG. 7 is a longitudinal cross-sectional view of the secondary energy absorbing box of the vehicle energy absorbing device according to the present invention taken along the line B-B in FIG. 6.

The secondary energy absorbing box 5 of the vehicle energy absorbing device according to the present invention is integrated onto the skin 3, and nested inside the primary energy absorbing box 2. Please refer to FIGS. 6 and 7 for the specific structure of the secondary energy absorbing box 5, which extends transversely as shown. On the bottom of the secondary energy absorbing box 5 are there boss structures 52 with different heights so as to guarantee a suitable strength of the secondary energy absorbing box 5. A backside opening structure 51 is provided at the center of the boss structures 52. The backside opening structure 51 not only reduces the weight of the skin 3, but also lowers the strength of the secondary energy absorbing box 5 in a crash. In a preferred embodiment, the secondary energy absorbing box 5 has a depth of 30 mm and a height of 30 mm so as to ensure its contact with the bottom 24 if deformed. In a preferred embodiment, the backside opening structure 51 is a 40 mm *15 mm square orifice. In a preferred embodiment, the secondary energy absorbing box 5 is at the center of the primary energy absorbing box 2, and the nesting amount of the secondary energy absorbing box is less than 10% of the depth of the primary energy absorbing box, that is, the distance between the secondary energy absorbing box 5 and the bottom of the primary energy absorbing box 2 is greater than 90% of the depth of the primary energy absorbing box 2.

Figure 8:
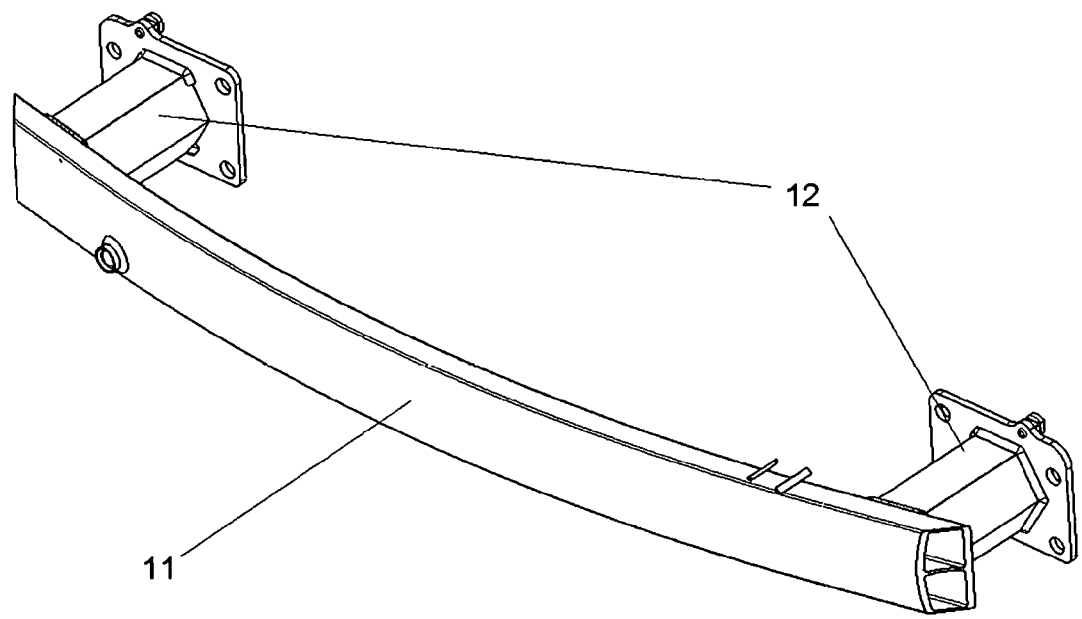
FIG. 8 is a perspective structural view of the front bumper beam of the vehicle energy absorbing device according to the present invention.

FIG. 8 shows the specific structure of the front bumper beam 1 of the vehicle energy absorbing device according to the present invention, which comprises a transverse beam 11 that extends transversely and securing structures 12 at both ends. The transverse beam 11 is an arc structure with its outer arc surface designed to conform to the bottom 24. The securing structures 12 at both ends are secured to the bumper system by means of fasteners, such as screws. In a preferred embodiment, the overlap between the primary energy absorbing box 2 and the front bumper beam 1 is more than 80% because the primary energy absorbing box 2 if pleated due to collapse needs the front bumper beam 1 to provide a reverse support. The front bumper beam 1 is unable to provide an effective support if it slides with respect to the primary energy absorbing box 2, hence, it is necessary to have them sufficiently overlapped. Preferably, the overlap between the bottom 24 and the transverse beam 11 is more than 80%. In a preferred embodiment, the gap between the bottom 24 and the transverse beam 11 is preferably 8 mm.

In the crash of a car with a pedestrian, the secondary energy absorbing box 5 of the vehicle energy absorbing device according to the present invention can provide continuous stiffness when the primary energy absorbing box 2 is nearly collapsed, so as to protect lower legs of pedestrians and reduce harms to legs of pedestrians. Specifically, when a pedestrian collides with the peripheral vehicle parts 7 in a crash, the primary energy absorbing box 2 collides with the transverse beam 11 of the front bumper beam 1 and collapses towards the opening 29 under the action of the transverse beam 11 to thereby absorb the collision energy. The bottom 24 collides with the secondary energy absorbing box 5, such that the secondary energy absorbing box 5 collapses to thereby absorb the collision energy.

The above is only the preferred embodiments of the present invention and is not intended to limit the scope of the present invention. Variations can be also be made to the embodiments of the present invention, that is, any simple and equivalent variations and modifications made according to the claims and description of the present application fall into the protection scope defined in the claims of the present invention. Those that are not described in detail herein are customary technical content.

The invention claimed is:

1. A vehicle energy absorbing device, comprising:
   a primary energy absorbing box having a U-shaped cross section with a bottom and walls extending therefrom; and
   a secondary energy absorbing box nested inside the primary energy absorbing box; wherein:
   the secondary energy absorbing box has a secondary bottom and secondary walls extending therefrom; and
   the secondary walls extend in a same direction as the walls of the primary energy absorbing box.

2. The vehicle energy absorbing device according to claim 1, said energy absorbing device comprising a bumper system having a front bumper beam, wherein an overlap between said primary energy absorbing box and said front bumper beam is more than 80%.

3. The vehicle energy absorbing device according to claim 1, wherein a nesting amount of said secondary energy absorbing box is less than 10% of the depth of said primary energy absorbing box.

4. The vehicle energy absorbing device according to claim 1, further comprising a skin, said secondary energy absorbing box being integrated onto said skin.

5. The vehicle energy absorbing device according to claim 1, further comprising a lower grid and an upper grid, said primary energy absorbing box being fixed to said lower grid and said upper grid.

6. The vehicle energy absorbing device according to claim 5, wherein:
   said primary energy absorbing box has an U upper end snap structure coupled to an energy absorbing box mounting structure of said upper grid; and
   an U lower end snap structure coupled to an energy absorbing box mounting structure of said lower grid.

7. The vehicle energy absorbing device according to claim 1, wherein said primary energy absorbing box is injection molded from polypropylene, EPDM rubber, and 10% talc modified material.

8. The vehicle energy absorbing device according to claim 1, wherein reinforcing rib structures are uniformly distributed within said primary energy absorbing box at a location corresponding to said bottom.

9. The vehicle energy absorbing device according to claim 1, wherein said walls of said primary energy absorbing box have a castellated outer surface that includes energy absorbing box bosses and energy absorbing box recesses that are staggered in sequence.

10. The vehicle energy absorbing device according to claim 9, wherein said energy absorbing box bosses have a width of 40 mm, said energy absorbing box recesses have a width of 70 mm, and the height difference therebetween is 5 mm.

11. The vehicle energy absorbing device according to claim 1, wherein said walls of said primary energy absorbing box have a bending point at a central portion thereof.

12. The vehicle energy absorbing device according to claim 11, wherein said walls of said primary energy absorbing box have a bending angle of 4 degrees at said bending point.

13. The vehicle energy absorbing device according to claim 1, wherein said primary energy absorbing box has a U opening at which said primary energy absorbing box is provided with at least one hinge.

14. The vehicle energy absorbing device according to claim 1, wherein boss structures having different heights are on the bottom of said secondary energy absorbing box.

15. The vehicle energy absorbing device according to claim 14, wherein a backside opening structure is at the center of said boss structures.

16. The vehicle energy absorbing device according to claim 15, wherein said backside opening structure is a 40 mm by 15 mm square orifice.

17. The vehicle energy absorbing device according to claim 1, further comprising:
   a bumper system having a front bumper beam,
   wherein said front bumper beam includes a transverse beam that conforms to said bottom of said primary energy absorbing box.

18. The vehicle energy absorbing device according to claim 17, wherein a gap between said transverse beam and said bottom is 8 mm.

19. A vehicle comprising a vehicle energy absorbing device according to claim 1.

* * * * *